United States Patent
Chen et al.

(10) Patent No.: US 9,459,691 B2
(45) Date of Patent: Oct. 4, 2016

(54) TECHNIQUES FOR ADJUSTING A POSITION OF A DISPLAY DEVICE BASED ON A POSITION OF A USER

(71) Applicant: GLOBALFOUNDRIES INC, Grand Cayman (KY)

(72) Inventors: Wei-Tien Chen, Taipei (TW); Yulianti Darmanto, Taipei (TW); Cheng-Hao Lin, Taipei (TW); Yu-Kang Liu, Taipei (TW); Hui-Wen Tsai, Taipei (TW)

(73) Assignee: GLOBALFOUNDRIES INC, Grand Cayman (KY)

( * ) Notice: Subject to any disclaimer, the term of this patent is extended or adjusted under 35 U.S.C. 154(b) by 0 days.

(21) Appl. No.: 14/476,223

(22) Filed: Sep. 3, 2014

(65) Prior Publication Data
US 2015/0070271 A1     Mar. 12, 2015

(30) Foreign Application Priority Data

Sep. 11, 2013 (TW) .............................. 102132850 A (51) Int. Cl.
*G09G 5/00* (2006.01)
*G06F 3/00* (2006.01)
(Continued)

(52) U.S. Cl.
CPC ............. *G06F 3/005* (2013.01); *G06F 1/1675* (2013.01); *G06F 1/1686* (2013.01); *H04N 5/64* (2013.01)

(58) Field of Classification Search
CPC .... G06F 3/005; G06F 1/1675; G06F 1/1686; H04N 5/64
USPC ...................... 345/8, 87, 156, 158, 419, 649; 361/679.21; 248/121; 382/113; 482/4
See application file for complete search history.

(56) References Cited

U.S. PATENT DOCUMENTS

| 5,293,427 A | 3/1994 | Ueno et al. |
| 5,410,609 A | 4/1995 | Kado et al. |

(Continued)

FOREIGN PATENT DOCUMENTS

| CN | 101226407 B | 8/2010 |
| CN | 101930238 A | 12/2010 |

(Continued)

OTHER PUBLICATIONS

Stieger et al., "Automatic Adjustment of Monitor Based on Correct Ergonomic Position", Publication Date: Oct. 26, 2006 URL: http://ip.com/IPCOM/000142389.

(Continued)

*Primary Examiner* — Prabodh M Dharia
(74) *Attorney, Agent, or Firm* — Scully Scott Murphy and Presser; Frank Digiglio (57) ABSTRACT

A technique for adjusting a display angle of an electronic apparatus includes capturing, by an image capturing module (of the electronic apparatus), images of a user with respect to a display device (of the electronic apparatus) at a reference first position and a second position. A processing module (of the electronic apparatus) provides an indication when the user exceeds a predetermined threshold in moving from the first position to the second position. A controlling module (of the electronic apparatus) causes a first driving module (of the electronic apparatus) to drive rotation of a first rotating module (of the electronic apparatus) in response to the processing module indicating the displacement has exceeded the predetermined threshold. The first rotating module is coupled to a base unit portion of the electronic apparatus.

16 Claims, 3 Drawing Sheets

(51) Int. Cl.
*G06F 1/16* (2006.01)
*H04N 5/64* (2006.01)

(56) References Cited

U.S. PATENT DOCUMENTS

| | | | |
|---|---|---|---|
| 5,677,701 A * | 10/1997 | Okuyama | B60K 37/02 345/7 |
| 6,879,709 B2 | 4/2005 | Tian et al. | |
| 7,409,149 B2 | 8/2008 | Spielberg | |
| 7,460,130 B2 * | 12/2008 | Salganicoff | A61B 5/14532 345/561 |
| 7,468,739 B2 * | 12/2008 | Fusama | G06Q 30/06 348/142 |
| 7,724,511 B2 | 5/2010 | Jacobs | |
| 8,289,399 B2 | 10/2012 | Stavely et al. | |
| 8,457,363 B2 | 6/2013 | Sung et al. | |
| 8,842,113 B1 * | 9/2014 | Holt | G09G 5/12 345/419 |
| 9,024,883 B2 * | 5/2015 | Mia | G06F 1/162 345/168 |
| 2003/0103324 A1 | 6/2003 | Gallivan | |
| 2005/0274852 A1 * | 12/2005 | Saez | A47B 23/043 248/121 |
| 2005/0275626 A1 * | 12/2005 | Mueller | H05B 37/029 345/156 |
| 2006/0123362 A1 * | 6/2006 | Keely | G06F 1/1626 715/857 |
| 2006/0152489 A1 * | 7/2006 | Sweetser | G06F 3/0346 345/158 |
| 2006/0209020 A1 * | 9/2006 | Scheiblhuber | G06F 1/1616 345/156 |
| 2006/0232552 A1 * | 10/2006 | Chung | F16M 11/08 345/156 |
| 2007/0086150 A1 * | 4/2007 | Chu | H04M 1/0237 361/679.21 |
| 2008/0129666 A1 * | 6/2008 | Shimotono | G06F 1/162 345/87 |
| 2009/0023554 A1 * | 1/2009 | Shim | A63B 24/0062 482/4 |
| 2009/0150006 A1 | 6/2009 | Albouyeh et al. | |
| 2009/0244012 A1 * | 10/2009 | Behar | G06F 1/162 345/169 |
| 2010/0277411 A1 * | 11/2010 | Yee | G06F 3/017 345/156 |
| 2011/0032587 A1 * | 2/2011 | Bjelkhagen | G02B 5/32 359/23 |
| 2012/0099254 A1 | 4/2012 | Rogers et al. | |
| 2012/0146891 A1 * | 6/2012 | Kalinli | H04N 19/33 345/156 |
| 2012/0188148 A1 * | 7/2012 | DeJong | G02B 27/0093 345/8 |
| 2012/0249412 A1 * | 10/2012 | Kurata | G06F 3/0346 345/156 |
| 2013/0050924 A1 | 2/2013 | Yang et al. | |
| 2013/0113783 A1 * | 5/2013 | Pourbigharaz | H04N 13/0409 345/419 |
| 2013/0229483 A1 * | 9/2013 | Venolia | H04N 7/142 348/14.08 |
| 2013/0322702 A1 * | 12/2013 | Piemonte | G06T 15/005 382/113 |
| 2014/0103112 A1 * | 4/2014 | Piazza | F41G 3/165 235/407 |
| 2014/0300715 A1 * | 10/2014 | Yoon | H04N 5/2251 348/63 |
| 2015/0022557 A1 * | 1/2015 | Austin | G06T 3/60 345/649 |
| 2015/0070263 A1 * | 3/2015 | Murillo | G06F 3/011 345/156 |
| 2015/0102995 A1 * | 4/2015 | Shen | G06F 3/013 345/156 |
| 2015/0286249 A1 * | 10/2015 | Chvatal | G06F 1/1615 361/679.07 |

FOREIGN PATENT DOCUMENTS

| | | |
|---|---|---|
| CN | 103279260 A | 9/2013 |
| TW | 201024958 A | 7/2010 |

OTHER PUBLICATIONS ip.com, "Flexible Dynamic Monitor", Publication Date: Oct. 10, 2011 URL: http://ip.com/IPCOM/000211527.

* cited by examiner

TECHNIQUES FOR ADJUSTING A POSITION OF A DISPLAY DEVICE BASED ON A POSITION OF A USER

This application claims priority to Taiwanese Patent Application 102132850, entitled "ELECTRONIC APPARATUS AND DISPLAY ANGLE ADJUSTMENT METHOD THEREWITH," filed on Sep. 11, 2013. The disclosure of Taiwanese Patent Application 102132850 is hereby incorporated herein by reference in its entirety for all purposes.

BACKGROUND

The disclosure relates to adjusting a position of a display device and, more specifically, to techniques for adjusting a position of a display device of an electronic device based on a position of a user with respect to the display device.

Many conventional electronic apparatus essentially include a base unit portion and a display device coupled to the base unit portion. Examples of electronic apparatus include, but are not limited to, a notebook computer and a personal digital assistant (PDA). Typically, the display device (such as a liquid crystal display) has been mounted on a cover portion of the electronic apparatus and a keyboard device has been disposed on the base unit portion of the electronic apparatus. The cover portion has usually been pivotally connected to a rear of the base unit portion by a hinge (or similar mechanism), such that the electronic apparatus can be opened or shut.

A user of a conventional electronic apparatus has usually manipulated a cover portion to expose and access a display device and a keyboard device. The user has also adjusted the angle of the display device and the keyboard device to change the viewing angle for the display device. In practice, the user has manually adjusted the angle of the display device and the keyboard device of the conventional electronic apparatus by hand to optimize viewing of the display by the user. As a viewing angle for a user of the display device may frequently change, the user has had to readjust the angle of the display device and the keyboard device repeatedly by hand. As a result, the conventional electronic apparatus lacks ease of use, is inefficient, and is somewhat inconvenient for a user to utilize.

BRIEF SUMMARY

A technique for adjusting a display angle of an electronic apparatus includes capturing, by an image capturing module (of the electronic apparatus), images of a user with respect to a display device (of the electronic apparatus) at a reference first position and a second position. The processing module provides an indication when the user exceeds a predetermined threshold in moving from the first position to the second position. A controlling module (of the electronic apparatus), causes a first driving module (of the electronic apparatus) to drive rotation of a first rotating module (of the electronic apparatus) in response to the processing module indicating the displacement has exceeded the predetermined threshold. The first rotating module is coupled to a base unit portion of the electronic apparatus.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide an electronic apparatus and a method for adjusting a position of a display of the electronic device based on a position of a user of the electronic device with respect to the display.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

According to an embodiment of the present disclosure, techniques for automatically adjusting a display angle are disclosed for use with an electronic apparatus with a display device. In one embodiment, a display angle automatic adjustment method for use with an electronic apparatus with a display device is disclosed. The method is not only simple to operate and easy to use, but is also provides a user-friendly solution. In one embodiment, an electronic apparatus is disclosed that includes: a base unit portion; a display device, electrically coupled to the base unit portion; a first rotating module rotatably pivotly coupled to the base unit portion; a first driving unit configured to drive the rotation of the first rotating module, an image capturing module substantially arranged on the display device and configured to execute user detection of a user appearing in front of the display device by capturing an image of the user; a processing module for processing the captured image; and a controlling module for controlling the first rotating module in response to the processing result of the processing module.

In one or more embodiments, the processing module calculates a reference position of the user, determines whether the user moves beyond a predetermined threshold, and calculates a displacement of the user based on the reference position and a second position in response to the user moving beyond the predetermined threshold to the second position. The driving module drives the rotation of the first rotating module in response to the displacement. The displacement includes one of linear displacement and angular displacement. The first rotating module includes a rotating stand and the rotating stand includes a seat and a turntable mounted on the seat and adapted to underpin the base unit portion. The turntable self-revolves relative to the seat to cause the base unit portion to self-revolve. The self-revolution of the turntable relative to the seat is calculated according to a horizontal component of the displacement. The horizontal component of the displacement is obtained by one of face detection and eye detection.

The first driving module includes a first control circuit and a first motor electrically coupled to the first control circuit and the first rotating module, such that the controlling module controls the first driving module to drive the first rotating module to rotate horizontally. The image capturing module comprises a camcorder for capturing an image in front of the display device, such that the image is converted into image data by the processing module. The reference position of the user and the movement of the user to the second position are obtained by one of face detection and eye detection. The electronic apparatus further includes a second rotating module rotatably connected to the base unit portion and the display device and a second driving module for driving rotation of the second rotating module. The second rotating module includes a hinge module for rotatably underpinning the display device and driving vertical rotation of the display device by the second driving module, such that the vertical rotation of the display device is calculated according to a vertical component of the displacement and the vertical component of the displacement is obtained by one of face detection and eye detection.

The second driving module includes a second control circuit and a second motor electrically coupled to the second control circuit and the second rotating module, such that the controlling module controls the second driving module to drive the second rotating module to rotate. In another embodiment, a display angle adjustment method for an electronic apparatus is disclosed. The electronic apparatus includes: a base unit portion; a display device electrically coupled to the base unit portion; a first rotating module rotatably pivotly coupled to the base unit portion; a first driving module for driving rotation of the first rotating module; an image capturing module substantially disposed on the display device; a processing module for processing a captured result of the image capturing module; and a controlling module for controlling the first rotating module in response to a processing result of the processing module.

In one embodiment, a disclosed method includes: executing a user detection of a user appearing in front of the display device by the image capturing module; calculating a reference position of the user by the processing module; determining, by the processing module, whether the user has moved beyond a predetermined threshold; calculating, by the processing module, in response to the user having moved beyond the predetermined threshold and reached a second position, a displacement of the user according to the reference position and the second position; and driving the rotation of the first rotating module by the driving module in response to the displacement. The first rotating module includes a rotating stand and the rotating stand includes a seat and a turntable mounted on the seat and adapted to underpin the base unit portion, such that the turntable self-revolves relative to the seat to cause the base unit portion to self-revolve.

In one or more embodiments, the electronic apparatus further includes: a second rotating module rotatably connected to the base unit portion and the display device; and a second driving module for driving rotation of the second rotating module. The second rotating module comprises a hinge module for rotatably underpinning the display device and driving vertical rotation of the display device by the second driving module.

Figure 1:
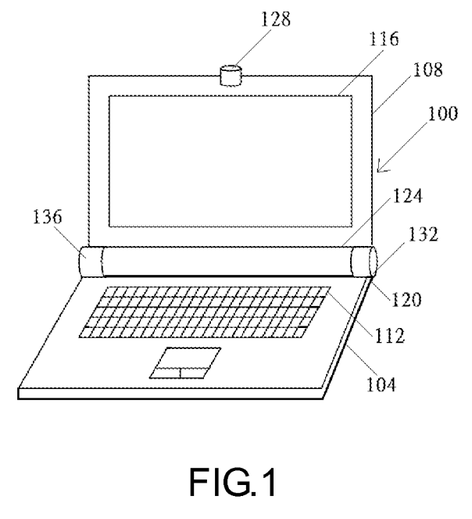
FIG. 1 is a perspective view of an electronic apparatus viewed from above according to an embodiment of the present disclosure.

FIG. 1 through FIG. 5 illustrate an electronic apparatus (data processing system) 100 that is configured to perform angle adjustment of an associated display according to at least one embodiment. FIG. 1 is a perspective view of the electronic apparatus 100 (e.g., a notebook computer) viewed from above according to a preferred embodiment of the present invention. As shown in FIG. 1, the electronic apparatus 100 comprises a base unit portion 104 and a cover portion 108 which is illustrated as being thinner than the base unit portion 104. The base unit portion 104 is case-like, for example, and contains therein hardware components, including but not limited to, a central processing unit (CPU), a memory, a circuit board, a hard disk drive (HDD), and a battery (not shown). A keyboard device 112 is disposed on the upper surface of the base unit portion 104 to function as an input device of the electronic apparatus 100. A display device 116 (including but not limited to a liquid crystal display) is mounted on the cover portion 108 to function as a display unit of the electronic apparatus 100.

Figure 2:
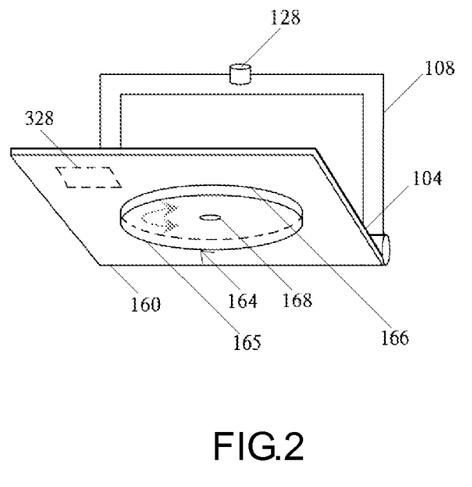
FIG. 2 is a perspective view of the electronic apparatus viewed from below according to an embodiment of the present disclosure.

FIG. 2 is a perspective view of the electronic apparatus 100 viewed from below according to one embodiment. A first rotating module 164, including but not limited to a turntable module, is mounted on a lower surface 160 of the base unit portion 104 to facilitate rotation of the electronic apparatus 100. According to an embodiment, a second rotating module 124, including but not limited to a hinge module, is disposed at a rear 120 of the base unit portion 104 and is adapted to rotate the cover portion 108. Referring again to FIG. 1, to start using the electronic apparatus 100, a user of the electronic apparatus 100 opens the cover portion 108 to expose and access the display device 116 and the keyboard device 112. In contrast, to stop using the electronic apparatus 100, the user may shut the cover portion 108 to put the display device 116 and the keyboard device 112 in close proximity.

In various embodiments, the electronic apparatus 100 is equipped with an image capturing module 128, including but not limited to a camcorder, for capturing an image in front of the display device 116 and converting the image into image data. The image capturing module 128 is electrically coupled to a processing module 304 (shown in FIG. 3). The processing module 304 processes the image data sent from the image capturing module 128. The image capturing module 128 may take various forms, such as complementary metal-oxide semiconductor (CMOS) and charge coupled device (CCD). The image capturing module 128 is positioned above the display device 116 and is equipped with a rotatable lens which in operation captures images above and below the display device 116, images on the left and right of the display device 116, and may even capture images behind the display device 116.

Alternatively, the image capturing module 128 may be equipped with an eyeball lens, a rotatable lens module coupled to the top of the display device 116 by a rotatable component, or a stationary lens, but the present invention is not limited thereto. The lens of the image capturing module 128 may be capable of automatic focusing which is usually performed with a distance-measuring device to measure and thereby adjust the distance between an object and the lens in order to capture images (see, for example, U.S. Pat. Nos. 7,409,149 and 8,289,399). In response to a face of a user being detected in front of the display device 116, the image capturing module 128 captures a reference position of the user's face. The image capturing module also captures a position of the user's face after a movement to determine whether the user's face has moved beyond a predetermined threshold. Depending on the vertical component of the movement, motors 132 and 136 drive the cover portion 108 or the display device 116 to rotate vertically. Related details and operation are described below.

Referring again to FIG. 2, in an embodiment, a turntable module 164, which is exemplified by a rotating stand, is mounted on the lower surface 160 of the base unit portion 104 to underpin the base unit portion 104, such that the electronic apparatus 100 is relatively stable. A motor 328 is mounted on the base unit portion 104 and is adapted to drive the turntable module 164. Under the control of the motor 328, the turntable module 164 causes the electronic apparatus 100 to revolve around an internal axis of the electronic apparatus 100. The rotating stand 164 may, for example, comprise a seat 165 and a turntable 166 mounted on the seat 165 and adapted to underpin the base unit portion 104. The turntable 166 revolves around a seat center 168, such that the base unit portion 104 revolves. The turntable 166 may be provided in the form of a saucer-shaped plate.

A shaft (not shown) may be disposed at the seat center 168 and may be coupled to the base unit portion 104. Given the synergetic operation of the turntable module 164 and the electronic apparatus 100, in one or more embodiments, the turntable module 164 may be, upon delivery of the electronic apparatus 100, fixed to the lower surface 160 of the base unit portion 104 by the shaft. That is, the turntable module 164 and the base unit portion 104 may be integrally coupled together. Alternatively, upon delivery of the electronic apparatus 100, only a connection mechanism, including but not limited to a connector, may be available on the lower surface 160 of the base unit portion 104, such that the connector connects the turntable module 164 and the base unit portion 104 to enable synergetic operation. In addition to the embodiment (in which the turntable module 164 is fixed to the base unit portion 104 from the outside) illustrated with FIG. 2, the turntable module 164 can also be confined to a recess of the base unit portion 104.

Alternatively, the turntable module 164 may be embedded in a docking station. In general, the turntable module 164 is either fixed to the docking station from the outside or confined to the docking station. The motor 328 may be disposed either in the base unit portion 104 or in the docking station. The motor 328 is controlled by an external control signal and adapted to adjust the rotation angle of the turntable 166. For the sake of brevity, components of the turntable are not further discussed herein. When a face of a user is detected in front of the display device 116, the image capturing module 128 captures the reference position of the user's face. The position of the user's face may also be detected after movement thereof to detect whether the user's face has moved beyond a predetermined threshold. Depending on the horizontal component of the movement, the motor 328 may drive the turntable module 164 or the base unit portion 104 to rotate horizontally. Related details and operation are described in additional detail below.

Figure 3:
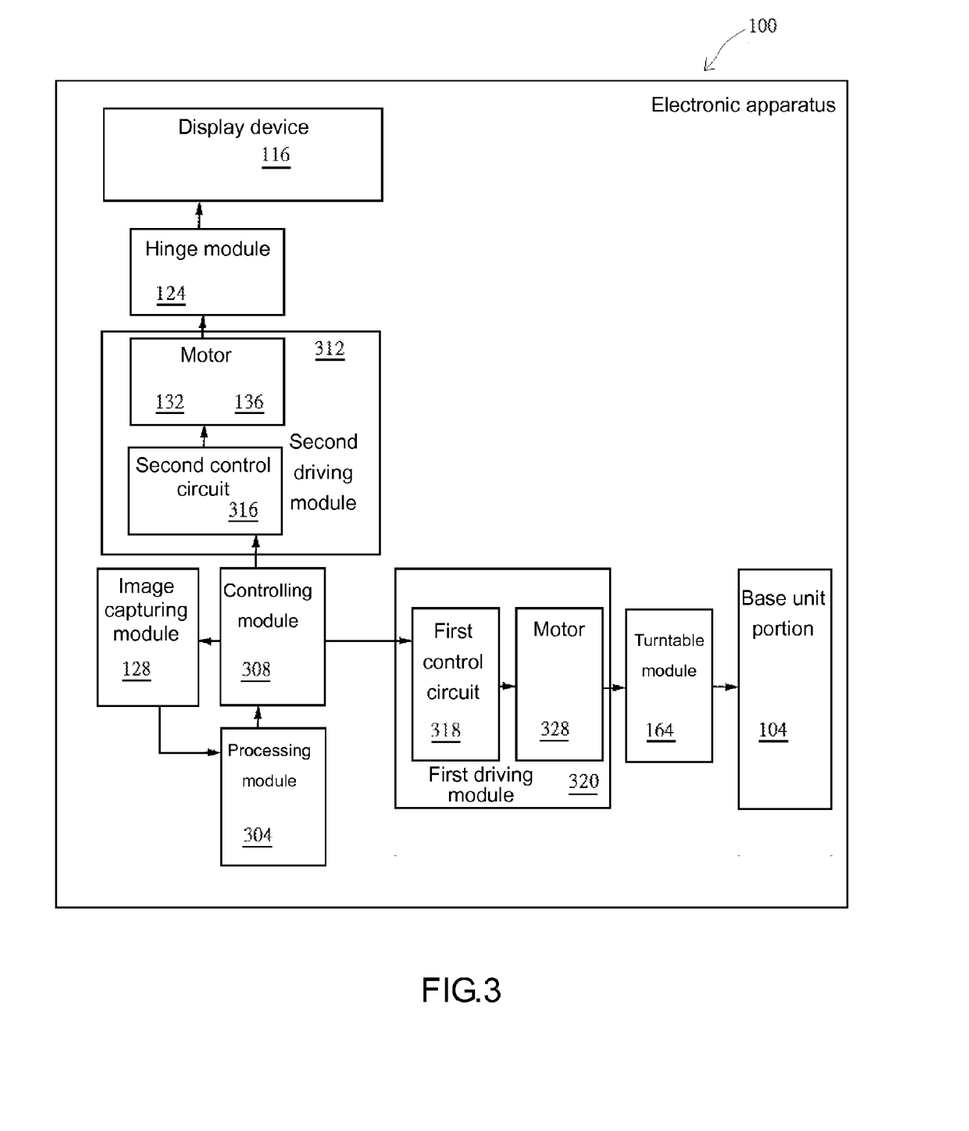
FIG. 3 is a schematic block diagram of the electronic apparatus according to an embodiment of the present disclosure.

FIG. 3 is a schematic block diagram of the electronic apparatus 100 capable of angle adjustment according to an embodiment of the present disclosure. The display device 116, the hinge module 124, the image capturing module 128, the motors 132 and 136, the turntable module 164, the base unit portion 104, and the motor 328 are described above and, as such, are not further described for the sake of brevity. The electronic apparatus 100 illustrated in FIG. 3 includes: a processing module 304; a controlling module 308; a first driving module 320 (comprising the motor 328 and a first control circuit 318); and a second driving module 312 (comprising the motors 132 and 136 and a second control circuit 316). In one embodiment, the image capturing module 128 takes the form of a camcorder that is capable of automatic focusing and has an angle of view (e.g., 180° or 360°), but the present invention is not limited thereto. The image capturing module 128 detects and captures an image of the user by face detection, eye detection, and the like, but the present invention is not limited thereto.

Using face detection as an example, as soon as the image capturing module 128 detects that the user has moved beyond a predetermined threshold and reached a second position, the processing module 304 calculates the user's displacement according to the reference position and the second position. The user's displacement includes but is not limited to linear displacement, angular displacement, and the like, but the present invention is not limited thereto. The first control circuit 318 controls the motor 328 to drive the first rotating module (turntable module) 164 to rotate according to the horizontal component of the displacement (including linear displacement, angular displacement, and the like), thereby allowing the base unit portion 104 to rotate by a corresponding angle. The second control circuit 316 controls the motors 132 and 136 to drive the second rotating module (hinge module) 124 to rotate according to the vertical component of the displacement (including linear displacement, angular displacement, and the like), thereby allowing the display device 116 to rotate by a corresponding angle. Details of the aforesaid calculation, control, and rotation are further described below.

Face detection typically involves discerning and identifying a human face among digital images by detecting facial features and ignoring the other objects in the digital images (see, for example, U.S. Pat. Nos. 6,879,709 and 5,410,609). Eye detection typically involves precisely detecting a human eye among the entered human face images (see, for example, U.S. Pat. Nos. 8,457,363 and 5,293,427). The image capturing module 128 is electrically coupled to the processing module 304. The image capturing module 128 is electrically coupled to the processing module 304. The face images captured by the image capturing module 128 are sent to the processing module 304. When the display device 116 is positioned at a predetermined reference positioning point, the processing module 304 records an eigenvector of a face image corresponding to the position. After the face image has moved, the processing module 304 calculates a new eigenvector, compares the new eigenvector and an initial eigenvector, and sends a comparison signal. The controlling module 308 is electrically coupled to the image capturing module 128 and the processing module 304 and is adapted to receive a signal from the processing module 304.

The controlling module 308 controls the first driving module 320 and the second driving module 312 according to the signal. The second driving module 312 comprises the second control circuit 316 and the motors 132, 136, which are electrically coupled to the second control circuit 316. The motors 132, 136 are electrically coupled to the hinge module 124. Under the control of the controlling module 308, the hinge module 124 is driven by the second driving module 312 to rotate vertically. The first driving module 320 comprises the first control circuit 318 and the motor 328, which is electrically coupled to the first control circuit 318. The motor 328 is electrically coupled to the turntable module 164. Under the control of the controlling module 308, the turntable module 164 is driven by the first driving module 320 to rotate horizontally.

In at least one embodiment, the processing module 304 works by an application executable in the base unit portion 104 or a system-on-a-chip (SoC) with computer-readable code. The controlling module 308 may be provided in the form of a micro-controller. The micro-controller typically comprises a CPU, a memory, a timer, a counter, and an input/output interface which are integrated into an integrated circuit (IC) chip. The aforesaid components are well-known among persons skilled in the art and, as such, are not described in further detail for the sake of brevity.

Figure 4:
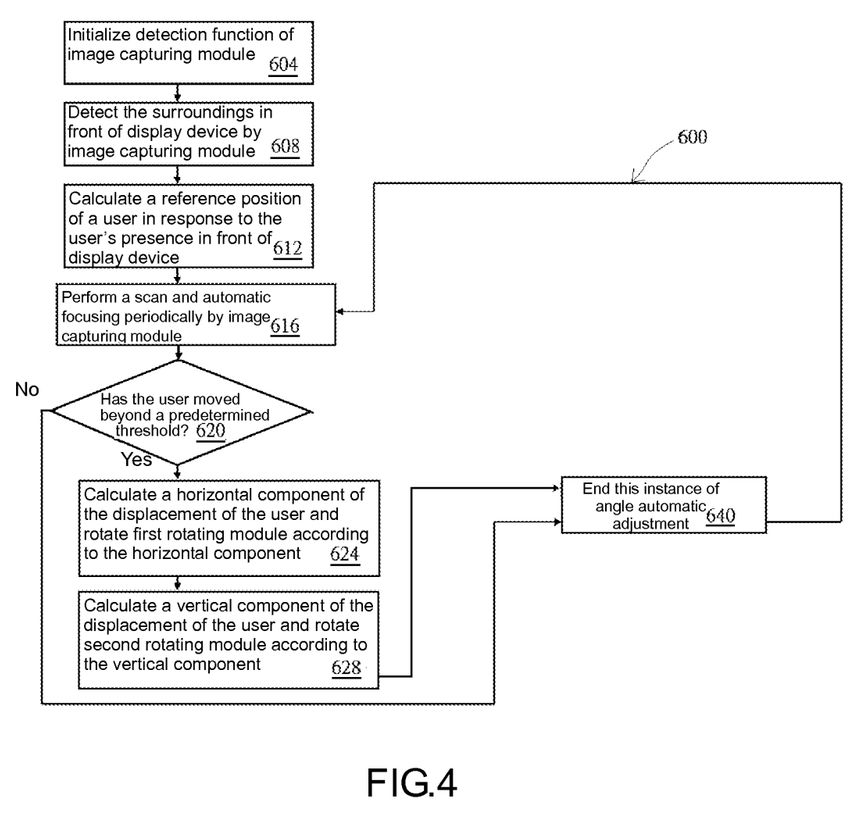
FIG. 4 is a flow chart of a display angle adjustment process according to an embodiment of the present disclosure.

FIG. 4, which is preferably studied together with FIG. 1 through FIG. 3, is a flow chart of a display angle automatic adjustment process for use with the electronic apparatus 100 (including but not limited to the notebook computer) according to an embodiment. Specifically, FIG. 4 illustrates a process 600 of display angle automatic adjustment of the display device 116 of the electronic apparatus 100. In general, a user may move and appear in front of the display device 116 before the process flow of the process 600 begins. In block 604 the detection function of the image capturing module 128 is initialized. The detection includes, but is not limited to, face detection, eye detection, a related technique, or a combination thereof. In block 608, surroundings in front of the display device 116 are detected by the image capturing module 128. The detection may include face detection, eye detection, a related technique, or a combination thereof. Next, in block 612, a reference position of the user is calculated according to the user's position in front of the display device 116 in response to the user's presence in front of the display device 116.

In general, before face detection begins, a user initially appears in front of the display device 116, which is defined as the reference position of the user's face, and assumes a position in which the user feels at ease and comfortable. In one embodiment, the reference position of the user's face is calculated by an automatic focusing function of the image capturing module 128. In block 616, a scan and automatic focusing is periodically performed by the image capturing module 128. In block 620 a determination is made as to whether the user has moved beyond a predetermined threshold according to a predetermined movement threshold based on the scan and automatic focusing performed periodically by the image capturing module 128. If the user has moved beyond a predetermined threshold, the process flow transfers to block 624. If the user has not moved beyond a predetermined threshold, the process flow transfers to block 640.

According to an embodiment, as mentioned earlier, when the image capturing module 128 detects user movement that exceeds a predetermined movement threshold (and ends up in the second position), the image capturing module 128 determines that the user has moved beyond a predetermined threshold.

Figure 5:
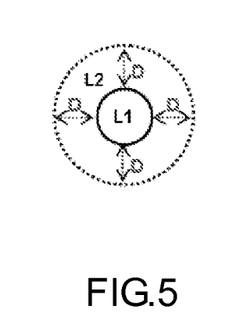
FIG. 5 is a schematic view which illustrates how to determine whether a user's face has moved beyond a predetermined threshold according to an embodiment of the present disclosure.

Referring to FIG. 5, there is shown a schematic view that illustrates how to determine whether a user's face has moved beyond a predetermined threshold according to one embodiment. As shown in FIG. 5, the reference position of the user's face is calculated to be a two-dimensional region L1. In this regard, the explanation below is illustrated with a round region L1. Given a predetermined movement threshold D, an annular region L2, which is separated from the round region L1 by a distance of the movement threshold D, is defined as the boundary of a movement of a predetermined degree. In an embodiment, if a detected user's face is located substantially inside the round region L1 and the annular region L2, the detected user's face will not be considered as having moved beyond a predetermined threshold. Conversely, if a detected user's face is located at a position outside the round region L1 and the annular region L2, the detected user's face will be considered as having moved beyond a predetermined threshold, and the position will be defined as the second position.

It should be appreciated that other methods for determining whether the user's face has moved beyond a predetermined threshold are contemplated. In block 624, a horizontal component of the displacement of the user is calculated and the first rotating module 164 is rotated according to the horizontal component in response to the determination that the user's face has moved beyond a predetermined threshold. In an embodiment where the angular displacement of the user is calculated, the horizontal component of the included angle of the reference position and the second position is calculated through the automatic focusing and face detection performed with the image capturing module 128 to facilitate control of the rotation of the first rotating module (turntable module) 164. By contrast, in an embodiment where the linear displacement of the user is calculated, the horizontal component of the shortest distance between the reference position and the second position is calculated through the automatic focusing and face detection performed with the image capturing module 128 to facilitate control of the rotation of the first rotating module (turntable module) 164.

In general, the horizontal component of the displacement of the user's face is detected before and after the movement of the user's face is calculated in a manner described above to determine an extent of the first rotating module 164. In block 628, a vertical component of the displacement of the user is calculated and the second rotating module 124 is rotated according to the vertical component in response to the determination that the user's face has moved beyond a predetermined threshold. In an embodiment where the user's angular displacement is calculated, the vertical component of the included angle of the reference position and the second position is calculated through the automatic focusing and face detection performed with the image capturing module 128 to facilitate control if the rotation of the second rotating module (hinge module) 124.

In an embodiment where the user's linear displacement is calculated, the vertical component of the shortest distance between the reference position and the second position is calculated through the automatic focusing and face detection performed with the image capturing module 128 to facilitate control of the rotation of the second rotating module (hinge module) 124. In general, the vertical component of the displacement of the user's face detected before and after the movement of the user's face is calculated in a manner described above to facilitate the rotation of the second rotating module 124. The result of the calculation indicates that it is practicable to carry out block 624 either before or after block 628 and to dispense with block 624 or block 628, as desired. In block 640, the instance of performing the display angle automatic adjustment process terminates. Then, the process flow transfers to block 616 in which the image capturing module 128 performs a scan and automatic focusing periodically, for example, to determine the horizontal component and the vertical component of the displacement from the second position to the next position (i.e., the third position) to adjust the angle of view of the display device 116 automatically. Subsequent operations may entail performing a typical system operation, for example, adjusting screen brightness so that the user feels comfortable watching the screen.

The disclosed operations may be implemented by hardware, firmware (that is, a combination of computer instructions and hardware devices, wherein data in the hardware devices are software data), or a system. Details of other basic structures and components of the electronic apparatus 100 may be determined by examination of conventional notebook computers or composite tablets. According to the present disclosure, the angle of view of the display device 116 of the electronic apparatus 100 is automatically adjusted according to the movement of a user's face. In this case, a user is not required to manually adjust an angle of view of the display device 116 but finds the electronic apparatus 100 is always convenient to use and easy to operate.

In the disclosed embodiments, although the reference position of the user's face and the moving the user's face to the second position (the moving the user from the second position to the third position, and the moving the user from the third position to the fourth position) are illustrated with face detection, persons skilled in the art can easily infer additional equivalent situations, including but not limited to the situation where the reference position of the user's eyeballs and the moving the user's eyeballs to the second position (the moving the user's eyeballs from the second position to the third position, and the moving the user's eyeballs from the third position to the fourth position) by eye detection and the like. As such, face detection, eye detection, or a combination thereof are equally applicable to facilitate user detection in the process 600. In the disclosed embodiments, the electronic apparatus 100 is exemplified by a notebook computer, but persons skilled in the art can easily infer more equivalent situations, for example, the electronic apparatus 100 may be (but is not limited to) a portable device, a projection screen, a desktop computer screen, a television screen, a projector lens, and a rotatable optical zoom lens.

Moreover, in the disclosed embodiments, the first rotating module 164 is exemplified by a turntable module, but persons skilled in the art can easily infer more equivalent situations, for example, the first rotating module 164 includes but is not limited to any element for driving a unit to rotate. Moreover, although the second rotating module 124 is exemplified by a hinge module, persons skilled in the art can easily infer more equivalent situations, for example, the second rotating module 124 includes but is not limited to any element for driving a unit to rotate.

Accordingly, techniques have been disclosed herein that advantageously rotate a display device of an electronic apparatus according to movement of a user to facilitate ease of use of the electronic apparatus by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An electronic apparatus, comprising:
   a base unit portion;
   a display device coupled to the base unit portion;
   a first rotating module coupled to the base unit portion;
   a first driving module coupled to the first rotating module and configured to cause the first rotating module to rotate;
   an image capturing module positioned to capture images of a user with respect to the display device;
   a processing module coupled to the image capturing module, wherein the processing module is configured to provide an indication in response to a displacement of the user from a reference first position to a second position exceeding a predetermined threshold, wherein the displacement of the user is determined from the captured images; and
   a controlling module coupled to the processing module, wherein the controlling module is configured to cause the first driving module to drive the first rotating module to rotate in response to the indication;
   wherein the electronic apparatus further comprises:
      a second rotating module rotatably coupled between the base unit portion and the display device; and
      a second driving module configured to cause the second rotating module to rotate;
   wherein the second rotating module comprises:
      a hinge module configured to vertically rotate the display device relative to the base unit portion in response to the second driving module, the rotation associated with the hinge module being around an axis that has a different orientation than an axis of rotation associated with the first rotating module; and wherein the first rotating module comprises a rotating stand, and the rotating stand comprises a seat and a turntable mounted on the seat, and wherein the turntable is adapted to underpin the base unit portion such that the turntable rotates relative to the seat to cause the base unit portion to rotate.

2. The electronic apparatus of claim 1, wherein the displacement comprises one of linear displacement and angular displacement.

3. The electronic apparatus of claim 1, wherein the rotation of the turntable relative to the seat is calculated according to a horizontal component of the displacement, and wherein the horizontal component of the displacement is obtained by one of face detection and eye detection.

4. The electronic apparatus of claim 1, wherein the first driving module comprises a first control circuit and a first motor electrically coupled to the first control circuit, and wherein the controlling module controls the first driving module to cause the first rotating module to rotate.

5. The electronic apparatus of claim 1, wherein the image capturing module comprises a camcorder for capturing the user images, and wherein the captured user images are converted into image data by the processing module.

6. The electronic apparatus of claim 1, wherein the first position of the user and the movement of the user to the second position are obtained by one of face detection and eye detection.

7. The electronic apparatus of claim 1, wherein the vertical rotation of the display device is calculated according to a vertical component of the displacement that is obtained by one of face detection and eye detection.

8. The electronic apparatus of claim 1, wherein the second driving module comprises:
a second control circuit; and
one or more motors electrically coupled to the second control circuit and the second rotating module, wherein the second control circuit is configured to control the second driving module to cause the second rotating module to rotate.

9. A method of adjusting a display angle of an electronic apparatus, comprising:
capturing, by an image capturing module associated with the electronic apparatus, images of a user with respect to a display device at a reference first position and a second position;
indicating, by a processing module of the electronic apparatus, whether a displacement of the user has exceeded a predetermined threshold in moving from the first position to the second position, wherein the displacement of the user is determined from the captured images;
causing, by a controlling module of the electronic apparatus, a first driving module of the electronic apparatus to drive rotation of a first rotating module of the electronic apparatus in response to the processing module indicating the displacement has exceeded the predetermined threshold, wherein the first rotating module is coupled to a base unit portion of the electronic apparatus; and
causing, by the controlling module of the electronic apparatus, a second driving module of the electronic apparatus to drive rotation of a second rotating module of the electronic apparatus that is rotatably coupled between the base unit portion and the display device in response to the processing module indicating the displacement has exceeded the predetermined threshold;
wherein the second rotating module comprises a hinge module configured to vertically rotate the display device relative to the base unit portion in response to the second driving module, the rotation associated with the hinge module being around an axis that has a different orientation than an axis of rotation associated with the first rotating module; and
wherein the first rotating module comprises a rotating stand, and the rotating stand comprises a seat and a turntable mounted on the seat, and wherein the turntable is adapted to underpin the base unit portion such that the turntable rotates relative to the seat to cause the base unit portion to rotate.

10. The method of claim 9, wherein the displacement comprises one of linear displacement and angular displacement.

11. The method of claim 9, wherein the rotation of the turntable relative to the seat is calculated according to a horizontal component of the displacement, and wherein the horizontal component of the displacement is obtained by one of face detection and eye detection.

12. The method of claim 9, wherein the first driving module comprises a first control circuit and a first motor electrically coupled to the first control circuit, and wherein the controlling module controls the first driving module to cause the first rotating module to rotate.

13. The method of claim 9, wherein the image capturing module comprises a camcorder for capturing the user images, and wherein the captured user images are converted into image data by the processing module.

14. The method of claim 9, wherein the first position of the user and the movement of the user to the second position are obtained by one of face detection and eye detection.

15. The method of claim 9, wherein the second driving module comprises a second control circuit and one or more motors coupled to the second control circuit and the second rotating module, and wherein the second control circuit is configured to control the second driving module to cause the second rotating module to rotate.

16. A data processing system, comprising:
a base unit portion;
a display device coupled to the base unit portion;
a turntable module coupled to the base unit portion;
a first driving module coupled to the turntable module;
a hinge module coupled between the display device and the base unit portion, the hinge module being configured to vertically rotate the display device relative to the base unit portion, the rotation associated with the hinge module being around an axis that has a different orientation than an axis of rotation associated with the turntable module;
a second driving module coupled to the hinge module;
an image capturing module positioned to capture images of a user with respect to the display device;
a processing module coupled to the image capturing module, wherein the processing module is configured to provide an indication in response to a displacement of the user from a reference first position to a second position exceeding a predetermined threshold, wherein the displacement of the user is determined from the captured images; and
a controlling module coupled to the processing module, wherein the controlling module is configured to cause one or more of the first driving module to drive the turntable module to rotate and the second driving module to cause the hinge module to rotate in response to the indication.

\* \* \* \* \*